(12) United States Patent
Danielson et al.

(10) Patent No.: US 8,001,697 B2
(45) Date of Patent: Aug. 23, 2011

(54) COUNTER BALANCE FOR COORDINATE MEASUREMENT DEVICE

(75) Inventors: David M. Danielson, Sorrento, FL (US); Marc M. Barber, Deltona, FL (US); Clark H. Briggs, DeLand, FL (US)

(73) Assignee: Faro Technologies, Inc., Lake Mary, FL (US)

(*) Notice: Subject to any disclaimer, the term of this patent is extended or adjusted under 35 U.S.C. 154(b) by 0 days.

(21) Appl. No.: 13/006,500

(22) Filed: Jan. 14, 2011

(65) Prior Publication Data

US 2011/0173825 A1 Jul. 21, 2011

Related U.S. Application Data

(60) Provisional application No. 61/296,555, filed on Jan. 20, 2010.

(51) Int. Cl.
*G01B 3/00* (2006.01)

(52) U.S. Cl. ............................................. 33/503; 33/556

(58) Field of Classification Search .................... 33/503, 33/556, 557, 558, 559, 560, 561
See application file for complete search history.

(56) References Cited

U.S. PATENT DOCUMENTS

| | | | |
|---|---|---|---|
| 3,458,167 A | 7/1969 | Cooley, Jr. | |
| 4,537,233 A | 8/1985 | Vroonland et al. | |
| 4,659,280 A | 4/1987 | Akeel | |
| 5,189,797 A | 3/1993 | Granger | |
| 5,289,264 A | 2/1994 | Steinbichler | |
| 5,402,582 A | 4/1995 | Raab | |
| 5,510,977 A | 4/1996 | Raab | |
| 5,528,505 A | 6/1996 | Granger et al. | |
| 5,535,524 A | 7/1996 | Carrier et al. | |
| 5,611,147 A | 3/1997 | Raab | |
| 5,724,264 A | 3/1998 | Rosenberg et al. | |
| 5,768,792 A | 6/1998 | Raab | |
| 5,829,148 A | 11/1998 | Eaton | |
| 5,832,416 A | 11/1998 | Anderson | |
| 5,909,939 A * | 6/1999 | Fugmann | 33/503 |
| 5,926,782 A | 7/1999 | Raab | |
| 5,956,857 A | 9/1999 | Raab | |
| 5,978,748 A | 11/1999 | Raab | |

(Continued)

FOREIGN PATENT DOCUMENTS

DE 202005000983 U1 4/2005

(Continued)

OTHER PUBLICATIONS

Romer "Romer Absolute Arm Product Brochure" (2010); Hexagon Metrology; www.hexagonmetrology.com; Hexagon AB 2010.

(Continued)

*Primary Examiner* — Yaritza Guadalupe-McCall
(74) *Attorney, Agent, or Firm* — Cantor Colburn LLP

(57) ABSTRACT

A portable articulated arm coordinate measurement device is provided. The coordinate measurement device includes a base and an articulated arm portion having at least one arm segment. A biasing member is coupled on a first end to the base and on a second end to the articulated arm portion. The first end of the biasing member is movable between a first position and a second position. An adjuster is coupled between the base and the biasing member. The adjuster is coupled to move the first end of the biasing member from the first position to the second position.

20 Claims, 17 Drawing Sheets

U.S. PATENT DOCUMENTS

| | | | |
|---|---|---|---|
| 5,983,936 A | 11/1999 | Schwieterman et al. | |
| D423,534 S | 4/2000 | Raab et al. | |
| 6,131,299 A | 10/2000 | Raab et al. | |
| 6,151,789 A | 11/2000 | Raab et al. | |
| 6,166,504 A | 12/2000 | Iida et al. | |
| 6,166,811 A | 12/2000 | Long et al. | |
| 6,219,928 B1 | 4/2001 | Raab et al. | |
| D441,632 S | 5/2001 | Raab et al. | |
| 6,253,458 B1 | 7/2001 | Raab et al. | |
| 6,298,569 B1 | 10/2001 | Raab et al. | |
| 6,438,856 B1 | 8/2002 | Kaczynski | |
| D472,824 S | 4/2003 | Raab et al. | |
| 6,598,306 B2 | 7/2003 | Eaton | |
| 6,611,617 B1 | 8/2003 | Crampton | |
| 6,612,044 B2 | 9/2003 | Raab et al. | |
| 6,681,495 B2 * | 1/2004 | Masayuki et al. | 33/501 |
| D491,210 S | 6/2004 | Raab et al. | |
| 6,868,359 B2 | 3/2005 | Raab | |
| 6,879,933 B2 | 4/2005 | Steffey et al. | |
| 6,892,465 B2 | 5/2005 | Raab et al. | |
| 6,904,691 B2 | 6/2005 | Raab et al. | |
| 6,931,745 B2 | 8/2005 | Granger | |
| 7,006,084 B1 | 2/2006 | Buss et al. | |
| 7,024,032 B2 | 4/2006 | Kidd et al. | |
| 7,051,447 B2 | 5/2006 | Kikuchi et al. | |
| 7,152,456 B2 | 12/2006 | Eaton | |
| 7,184,047 B1 | 2/2007 | Crampton | |
| 7,191,541 B1 | 3/2007 | Weekers et al. | |
| 7,249,421 B2 | 7/2007 | MacManus et al. | |
| 7,296,979 B2 | 11/2007 | Raab et al. | |
| 7,313,264 B2 | 12/2007 | Crampton | |
| 7,525,276 B2 | 4/2009 | Eaton | |
| 7,545,517 B2 | 6/2009 | Rueb et al. | |
| 7,546,689 B2 | 6/2009 | Ferrari et al. | |
| D599,226 S | 9/2009 | Gerent et al. | |
| 7,591,077 B2 | 9/2009 | Pettersson | |
| 7,604,207 B2 | 10/2009 | Hasloecher et al. | |
| 7,624,510 B2 | 12/2009 | Ferrari | |
| D607,350 S | 1/2010 | Cooduvalli et al. | |
| 7,693,325 B2 | 4/2010 | Pulla et al. | |
| 7,712,224 B2 | 5/2010 | Hicks | |
| 7,743,524 B2 | 6/2010 | Eaton et al. | |
| 7,752,003 B2 | 7/2010 | MacManus | |
| 7,765,707 B2 | 8/2010 | Tomelleri | |
| 7,774,949 B2 | 8/2010 | Ferrari | |
| 7,779,548 B2 | 8/2010 | Ferrari | |
| 7,779,553 B2 | 8/2010 | Jordil et al. | |
| 7,784,194 B2 * | 8/2010 | Raab et al. | 33/503 |
| 7,793,425 B2 * | 9/2010 | Bailey | 33/503 |
| 7,804,602 B2 | 9/2010 | Raab | |
| 7,805,854 B2 | 10/2010 | Eaton | |
| RE42,055 E | 1/2011 | Raab et al. | |
| RE42,082 E | 2/2011 | Raab et al. | |
| 7,881,896 B2 | 2/2011 | Atwell et al. | |
| 2003/0053037 A1 | 3/2003 | Blaesing-Bangert et al. | |
| 2003/0208919 A1 | 11/2003 | Raab et al. | |
| 2004/0162700 A1 | 8/2004 | Rosenberg et al. | |
| 2005/0283989 A1 | 12/2005 | Pettersson | |
| 2006/0028203 A1 | 2/2006 | Kawashima et al. | |
| 2006/0123649 A1 | 6/2006 | Muller | |
| 2006/0169050 A1 | 8/2006 | Kobayashi et al. | |
| 2006/0291970 A1 | 12/2006 | Granger | |
| 2007/0043526 A1 | 2/2007 | De Jonge et al. | |
| 2007/0058162 A1 | 3/2007 | Granger | |
| 2007/0097382 A1 | 5/2007 | Granger | |
| 2007/0105238 A1 | 5/2007 | Mandl et al. | |
| 2008/0052936 A1 | 3/2008 | Briggs et al. | |
| 2008/0148585 A1 * | 6/2008 | Raab et al. | 33/503 |
| 2008/0196260 A1 | 8/2008 | Pettersson | |
| 2008/0235969 A1 | 10/2008 | Jordil et al. | |
| 2008/0252671 A1 | 10/2008 | Cannell et al. | |
| 2008/0256814 A1 | 10/2008 | Pettersson | |
| 2008/0257023 A1 | 10/2008 | Jordil et al. | |
| 2008/0271332 A1 | 11/2008 | Jordil et al. | |
| 2008/0282564 A1 | 11/2008 | Pettersson | |
| 2009/0031575 A1 | 2/2009 | Tomelleri | |
| 2009/0083985 A1 | 4/2009 | Ferrari | |
| 2009/0133276 A1 * | 5/2009 | Bailey | 33/503 |
| 2009/0139105 A1 | 6/2009 | Granger | |
| 2009/0249634 A1 | 10/2009 | Pettersson | |
| 2009/0265946 A1 | 10/2009 | Jordil et al. | |
| 2010/0057392 A1 | 3/2010 | York | |
| 2010/0078866 A1 | 4/2010 | Pettersson | |
| 2010/0095542 A1 | 4/2010 | Ferrari | |
| 2010/0208062 A1 | 8/2010 | Pettersson | |
| 2010/0281705 A1 | 11/2010 | Verdi et al. | |
| 2010/0286941 A1 | 11/2010 | Merlot | |
| 2010/0325907 A1 | 12/2010 | Tait | |
| 2011/0007326 A1 | 1/2011 | Daxauer et al. | |
| 2011/0013199 A1 | 1/2011 | Siercks et al. | |

FOREIGN PATENT DOCUMENTS

| | | |
|---|---|---|
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005036929 B4 | 6/2010 |
| DE | 102008062763 B3 | 7/2010 |
| EP | 0767357 B1 | 5/2002 |
| EP | 1361414 A1 | 11/2003 |
| EP | 1669713 A1 | 6/2006 |
| EP | 1429109 B1 | 4/2007 |
| EP | 1764579 B1 | 12/2007 |
| EP | 2023077 A1 | 2/2009 |
| EP | 2068067 A1 | 6/2009 |
| FR | 2935043 A1 | 2/2010 |
| GB | 2341203 A | 3/2000 |
| JP | 7210586 A | 8/1995 |
| JP | 2004257927 A | 9/2004 |
| JP | 2006301991 A | 11/2006 |
| WO | 9208568 A1 | 5/1992 |
| WO | 9910706 A1 | 3/1999 |
| WO | 0034733 | 6/2000 |
| WO | 02101323 A2 | 12/2002 |
| WO | 2004096502 A1 | 11/2004 |
| WO | 2005100908 A1 | 10/2005 |
| WO | 2006051264 A1 | 5/2006 |
| WO | 2007125081 A1 | 11/2007 |
| WO | 2007144906 A1 | 12/2007 |
| WO | 2008075170 A1 | 6/2008 |
| WO | 2009001165 A1 | 12/2008 |
| WO | 2009016185 A1 | 2/2009 |
| WO | 2009130169 A1 | 10/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |

OTHER PUBLICATIONS

Romer "Romer Absolute Arm Maximum Performance Portable Measurement" (Printed Oct. 2010); Hexagon Metrology, Inc. http://us:ROMER.com; Hexagon Metrology, Inc 2010.

International Search Report mailed Apr. 18, 2011 for International Application No. PCT/US2011/021250 filed Jan. 14, 2011; references cited in PCT are listed herein.

Written Opinion of the International Searching Authority mailed Apr. 18, 2011 for International Application No. PCT/US2011/021250 filed Jan. 14, 2011.

Information on Electro-Optical Information Systems; EOIS 3D Mini-Moire C.M.M. Sensor for Non-Contact Measuring & Surface Mapping; Direct Dimensions, Jun. 1995.

* cited by examiner

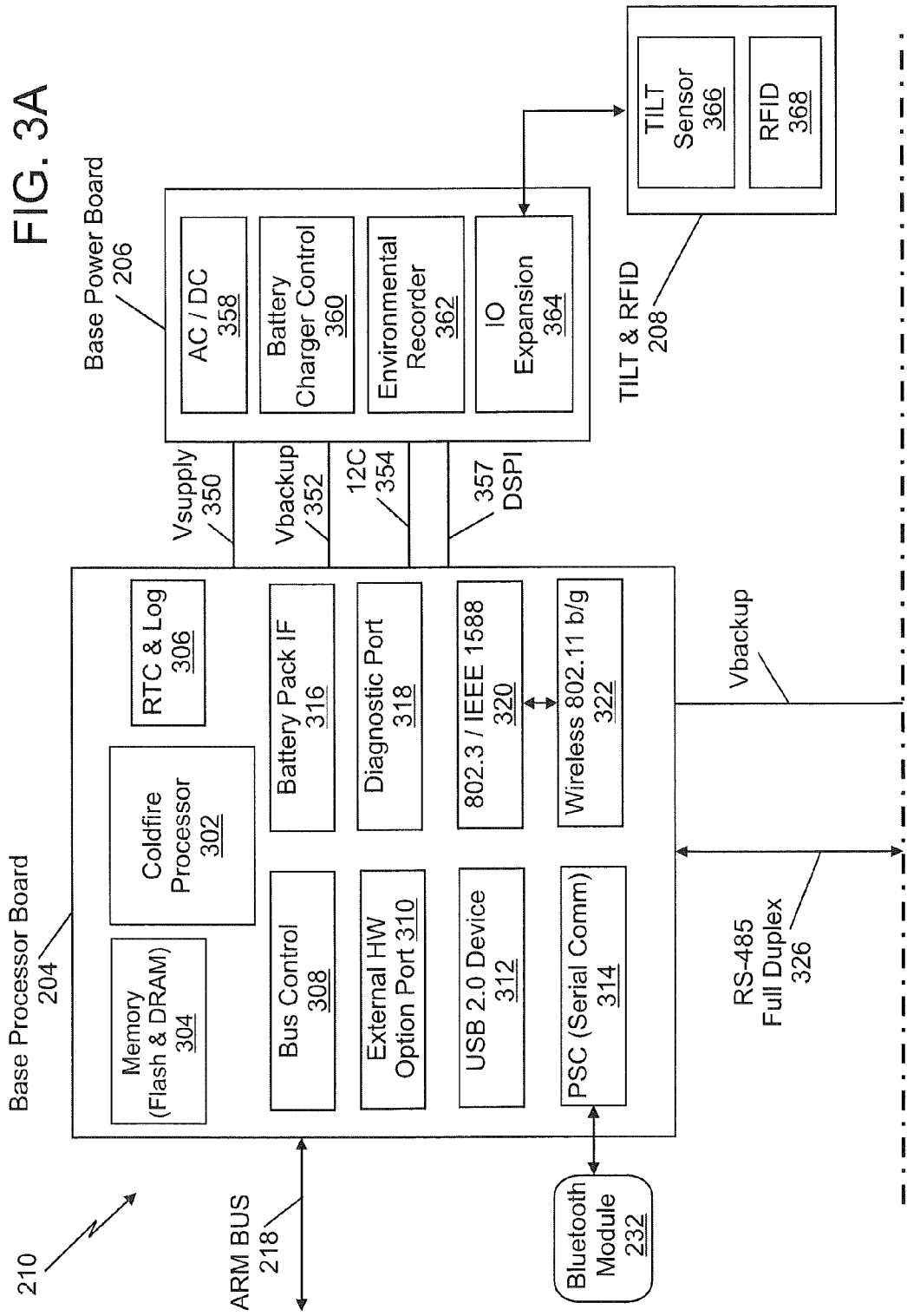

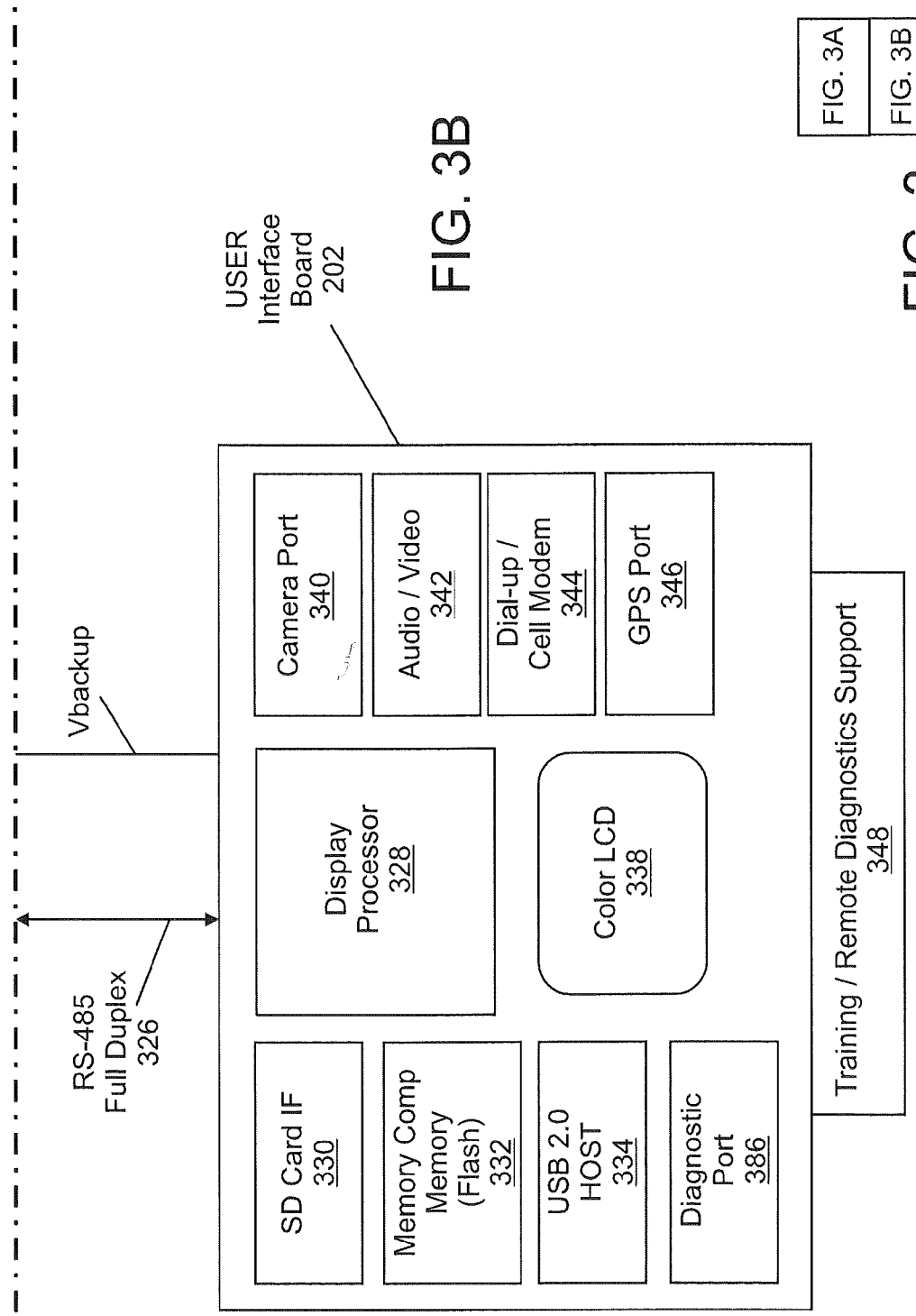

COUNTER BALANCE FOR COORDINATE MEASUREMENT DEVICE

CROSS-REFERENCE TO RELATED APPLICATIONS

The present application claims the benefit of provisional application No. 61/296,555 filed Jan. 20, 2010, the content of which is hereby incorporated by reference in its entirety.

BACKGROUND

The present disclosure relates to a coordinate measuring machine, and more particularly to a portable articulated arm coordinate measuring machine having an adjustable counterbalance system.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

The articulated arm may be of a variety of lengths, typically between two feet and four feet for example. To ease the use of the arm, a counter balance arrangement may be coupled to a fixed base to offset the torque applied by the weight of the articulated arm. The counter balance allows the articulated arm to be moved by the user with little effort and prevents the articulated arm from falling if released by the user. Unfortunately, in some circumstances the counter balance may apply too much, or too little torque due to differences in components, tolerances, configurations, and accessories of the articulated arm. As a result, rather than moving freely, the articulated arm may sag or resist movement depending on whether too little or too much counter balance is applied.

Accordingly, while existing articulated arms are suitable for their intended purposes what is needed is an AACMM having an improved adjustment and calibration of a counter balance for the articulated arm.

SUMMARY OF THE INVENTION

In accordance with an embodiment of the invention, a portable articulated arm coordinate measurement device (AACMM) for measuring coordinates of an object in space is provided. The AACMM includes a base. A manually positionable articulated arm portion is provided having an opposed first end and second end, the arm portion being rotationally coupled to the base, the arm segment including a plurality of connected arm segments, each of the arm segments including at least one position transducer for producing a position signal. A measurement device is attached to the first end. An electronic circuit is provided for receiving the position signals from the transducers and for providing data corresponding to a position of the measurement device. A rotation assembly is coupled to the second end to the base, the rotation assembly having a first axis of rotation and a second axis of rotation substantially perpendicular to the first axis of rotation. A biasing member is operably coupled between the rotation assembly and the second end to apply a force to the second end about the second axis of rotation the biasing member having at least one projection thereon. An adjuster having a threaded portion is arranged to engage the at least one projection, wherein the force applied by the biasing member to the arm portion changes in response to movement of the adjuster.

In accordance with another embodiment of the invention, another AACMM is provided. The AACMM includes a base. A manually positionable articulated arm portion is provided having an opposed first end and second end, the arm portion including a plurality of connected arm segments, each of the arm segments including at least one position transducer for producing a position signal. A measurement device is attached to the first end. An electronic circuit is provided for receiving the position signals from the transducers and for providing data corresponding to a position of the measurement device. A biasing member is operably coupled between the base and the second end, the biasing member having at least one projection movable between a first position and a second position. An adjuster having a threaded portion is operably coupled between the base and the biasing member, wherein the threaded portion is engaged to the at least one projection to move the at least one projection between the first position to the second position.

In accordance with another embodiment of the invention, another AACMM for measuring coordinates of an object in space is provided. The AACMM includes a base. A manually positionable articulated arm portion is provided having an opposed first end and second end, the arm portion including a plurality of connected arm segments, each arm segment including at least one position transducer for producing a position signal. A measurement device is attached to the first end. An electronic circuit is provided which receives the position signals from the transducers and provides data corresponding to a position of the measurement device. A rotation assembly is rotationally coupled to the second end to the base about a first axis of rotation and a second axis of rotation, the second axis of rotation being substantially perpendicular to the first axis of rotation. A biasing member is arranged within the rotation assembly and having a third end operably coupled to the second end, the biasing member having a fourth end opposite the third end, the fourth end being movable between a first position and a second position. An adjusting member is operably coupled for rotation to the base and operably coupled to the fourth end, wherein the fourth end moves between the first position and the second position in response to a rotation of the adjusting member.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGS.:

FIG. 1, including

FIG. 3, including FIGS. 3A and 3B taken together, is a block diagram describing detailed features of the electronic data processing system of FIG. 2 in accordance with an embodiment;

DETAILED DESCRIPTION

Portable articulated arm coordinate measuring machines provide manufacturers and others with a convenient and flexible way to obtain high quality, high precision measurements of parts, components and objects. To provide this flexibility, the AACMM may have a multi-segmented arm having many degrees of freedom. Embodiments of the present invention provide advantages in offsetting the weight of the multi-segmented arm allowing the operator to make measurements with less effort and higher reliability. Embodiments of the present invention also provide advantages in providing a counter balance that is adjustable to compensate for differences in weights, tolerances and accessories associated with the multi-segmented arm.

Figure 1A:
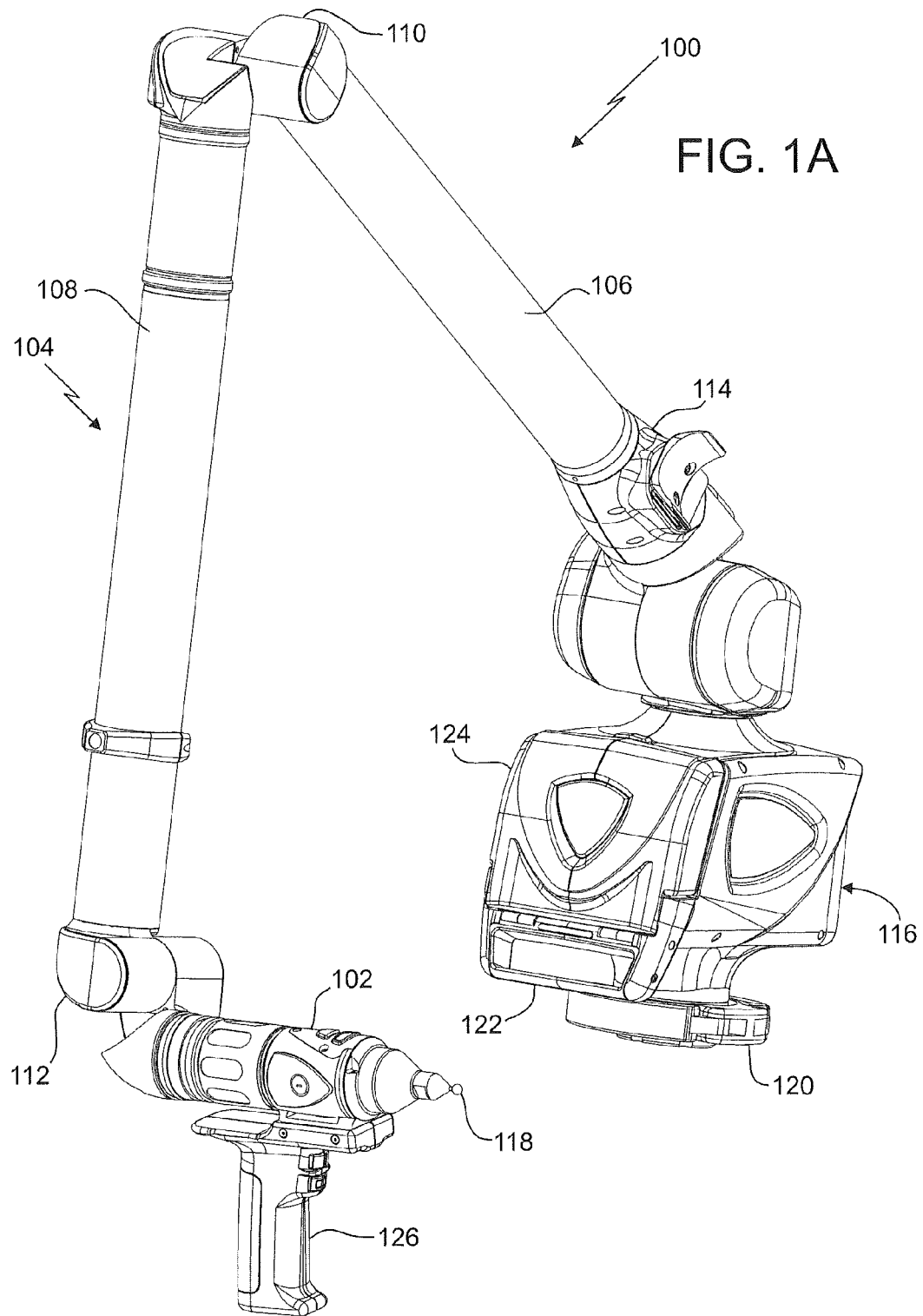
FIGS. 1A and 1B, are perspective views of a portable articulated arm coordinate measuring machine (AACMM) having embodiments of various aspects of the present invention therewithin.
Figure 1B:
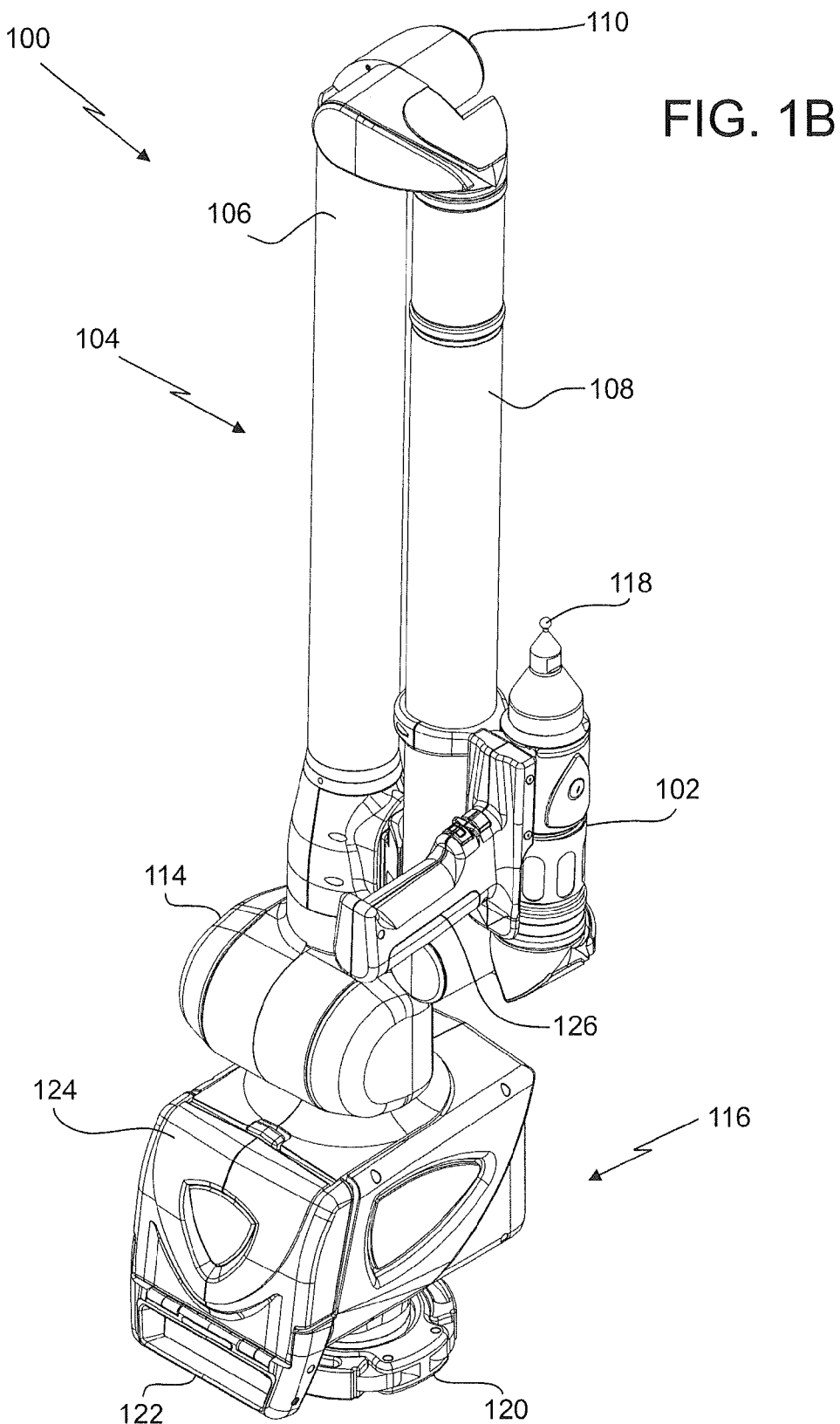

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
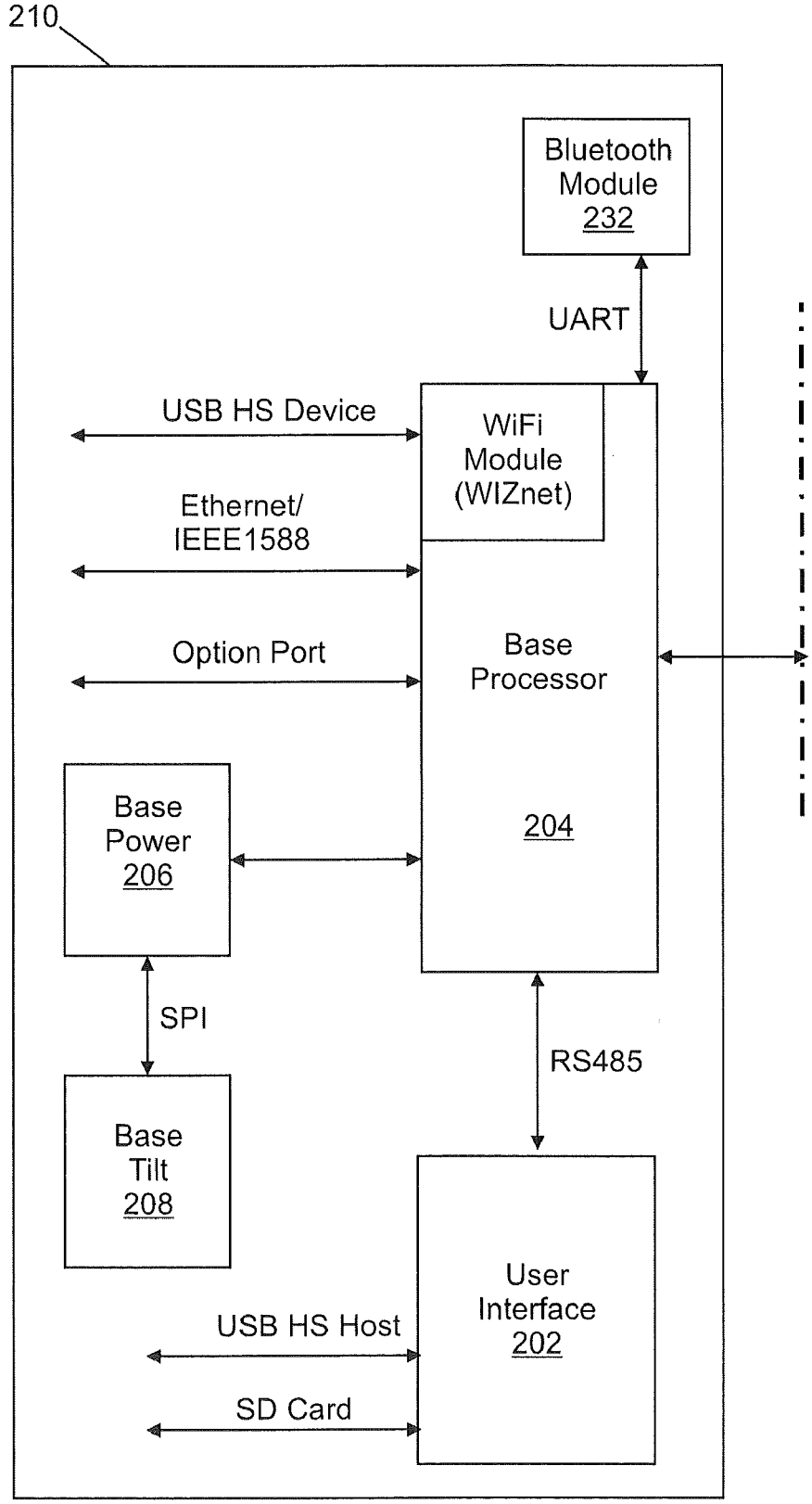
FIG. 2, including FIGS. 2A-2D taken together, is a block diagram of electronics utilized as part of the AACMM of FIG. 1 in accordance with an embodiment.
Figure 2B:
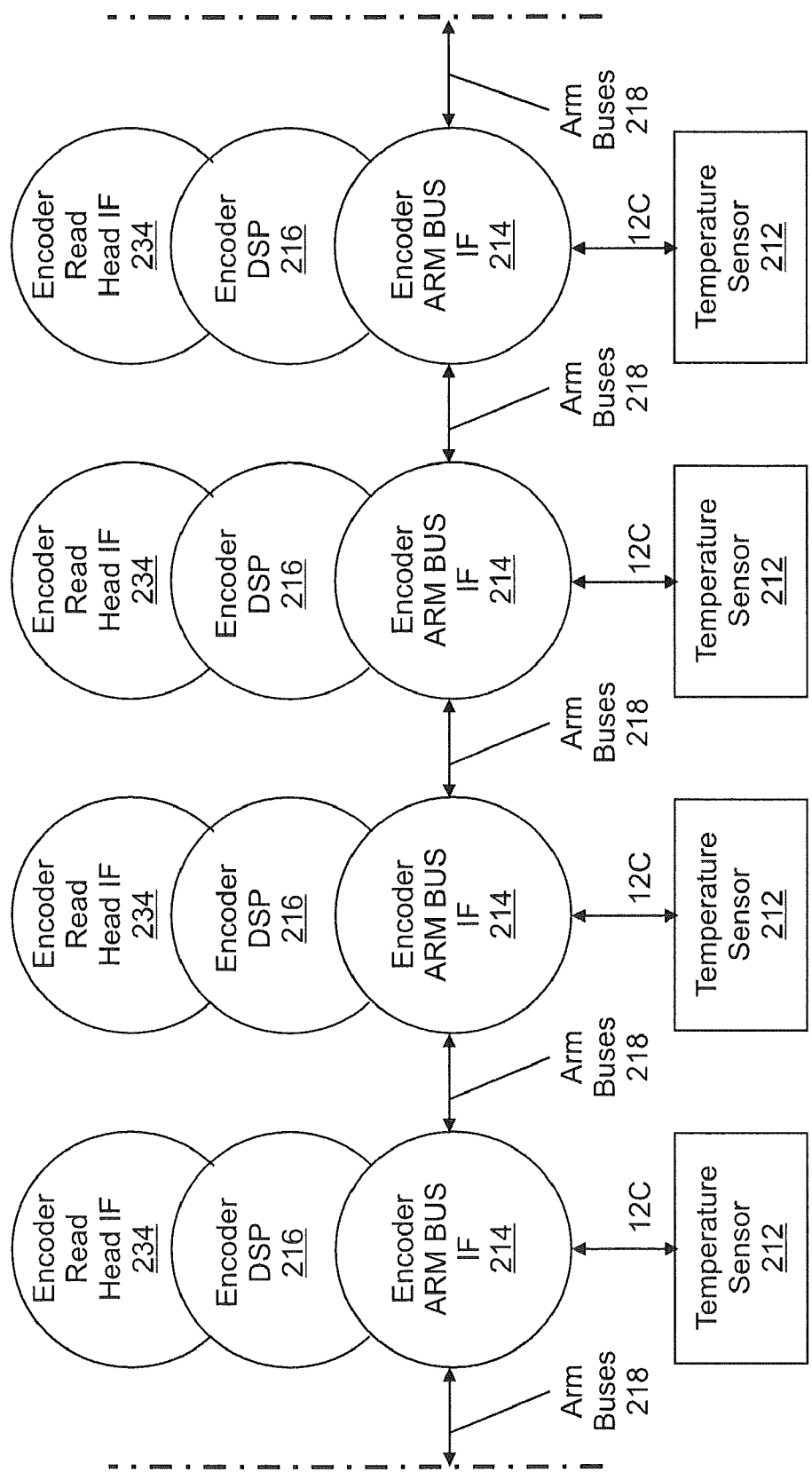
Figure 2C:
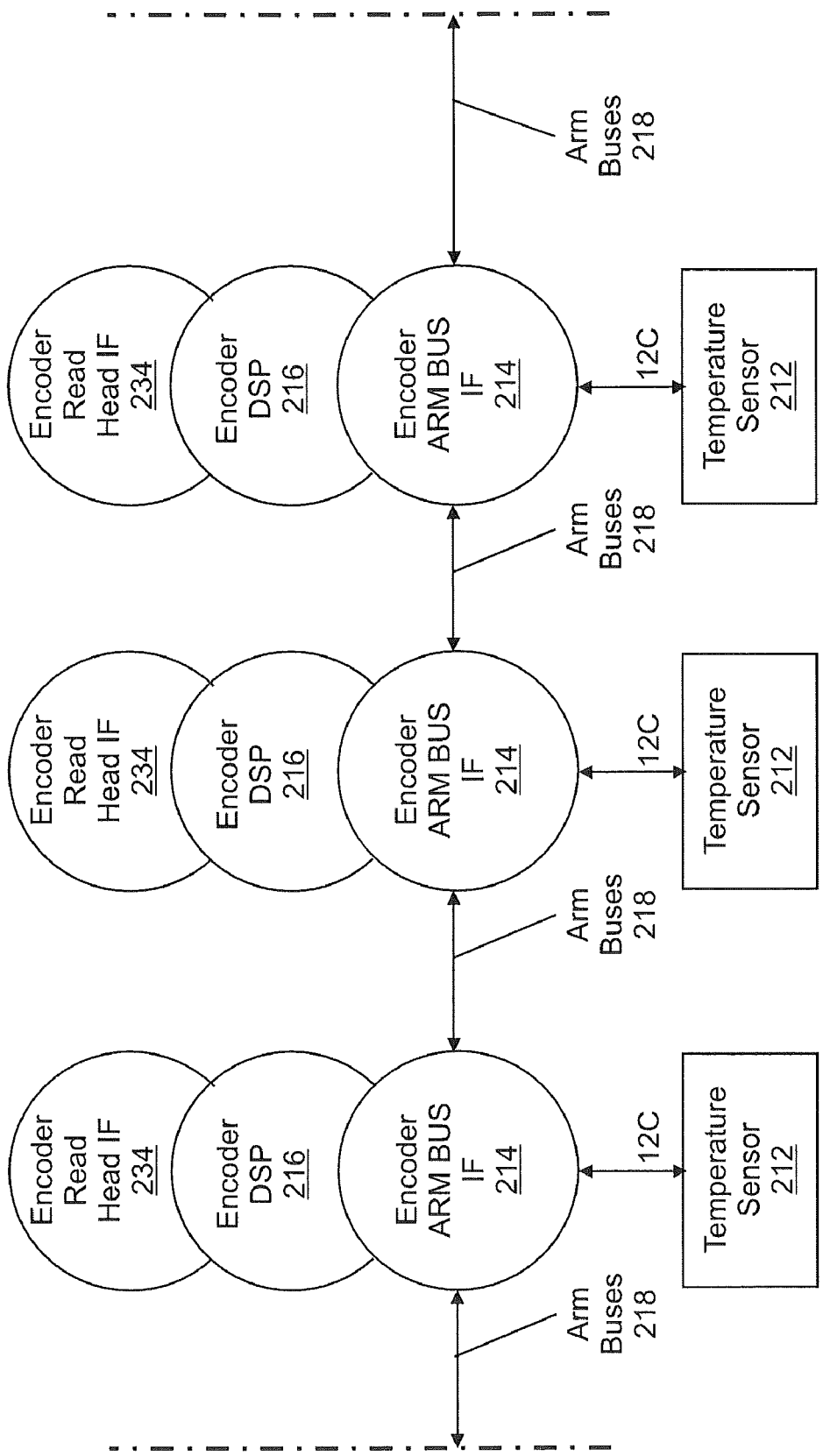
Figure 2D:
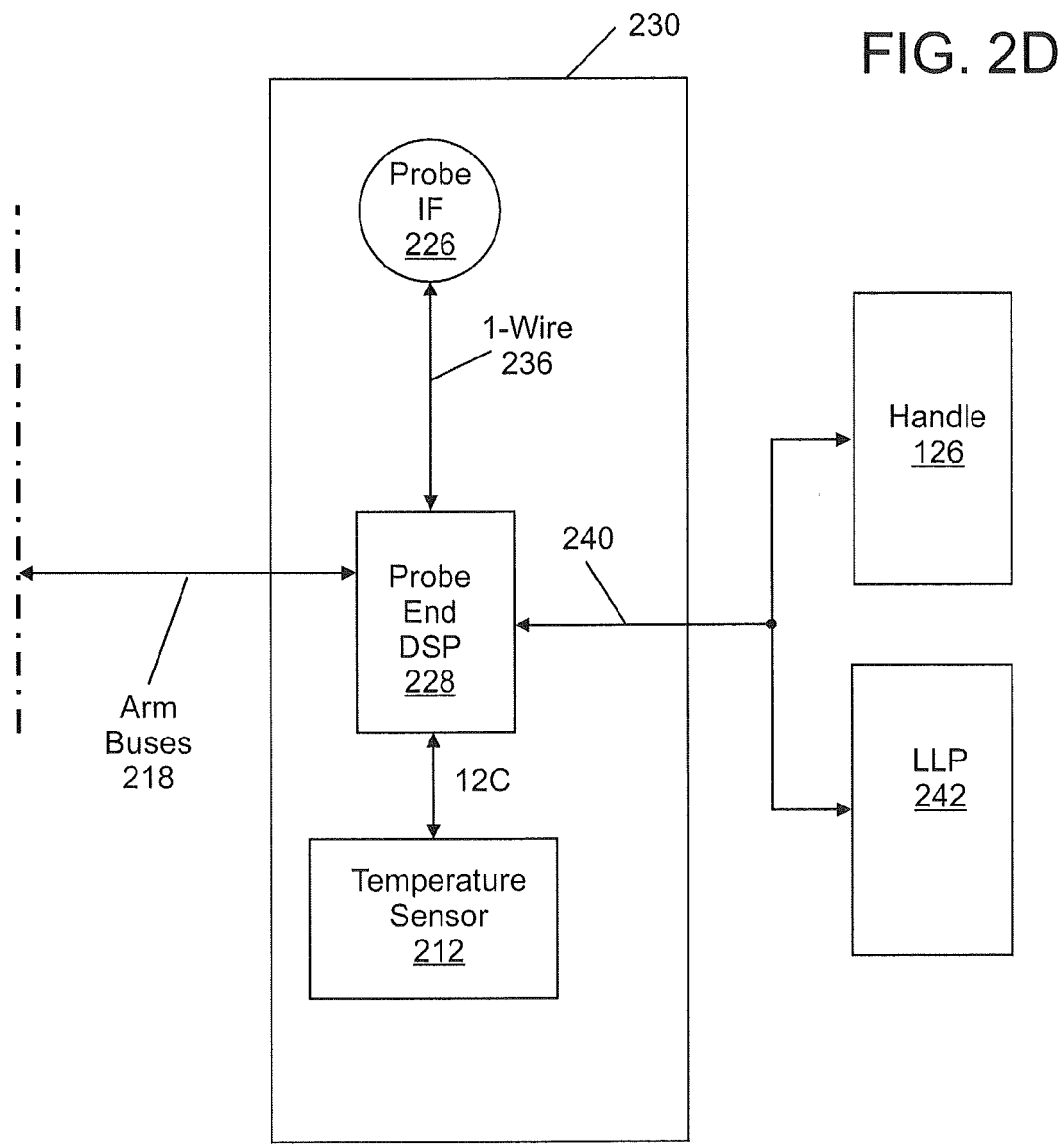
Figure 2:
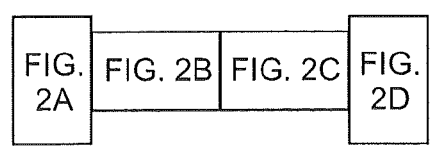
Figure 4:
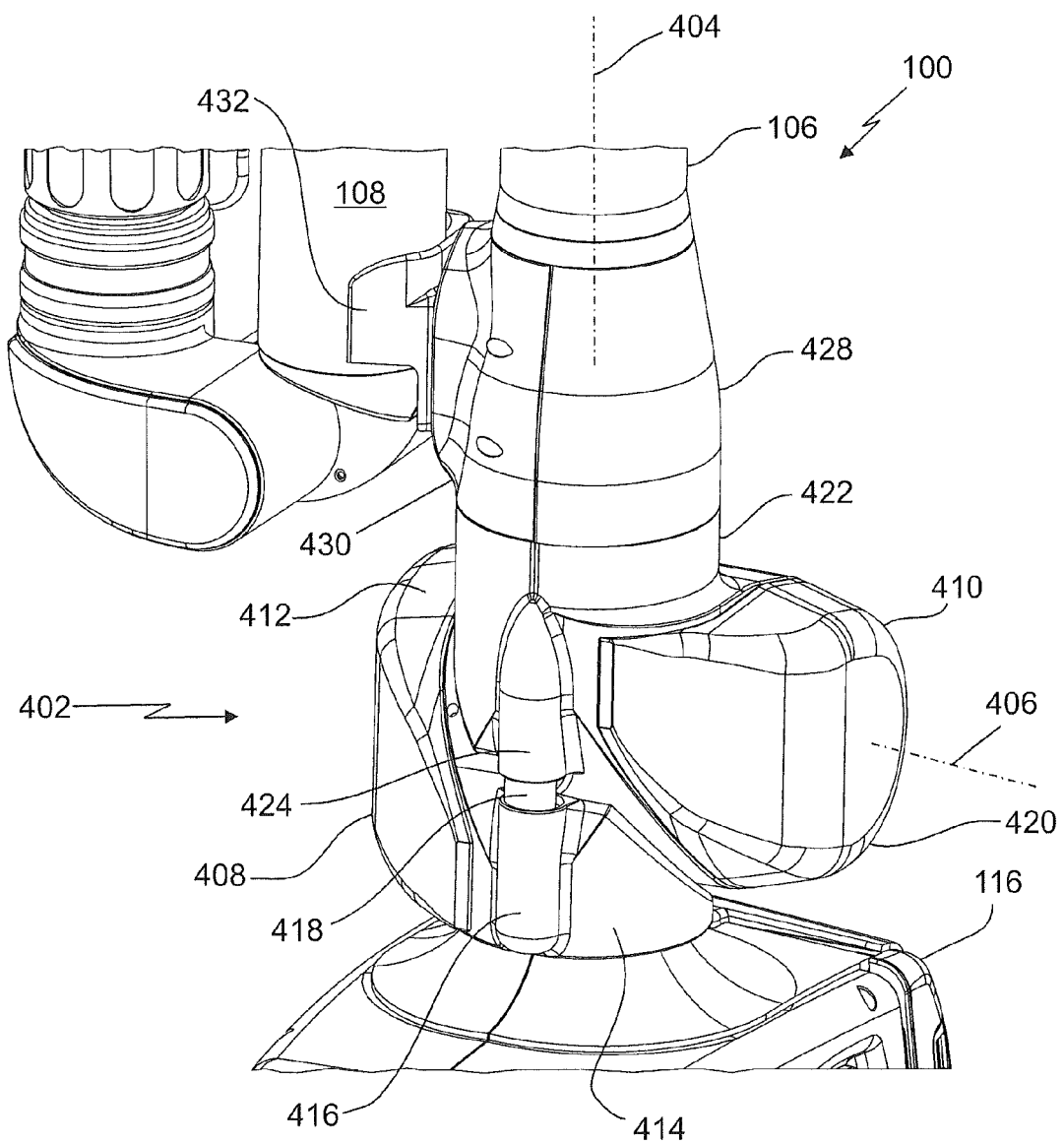
FIG. 4 is a partial perspective view of the AACMM of FIG. 1 in a first position.
Figure 5:
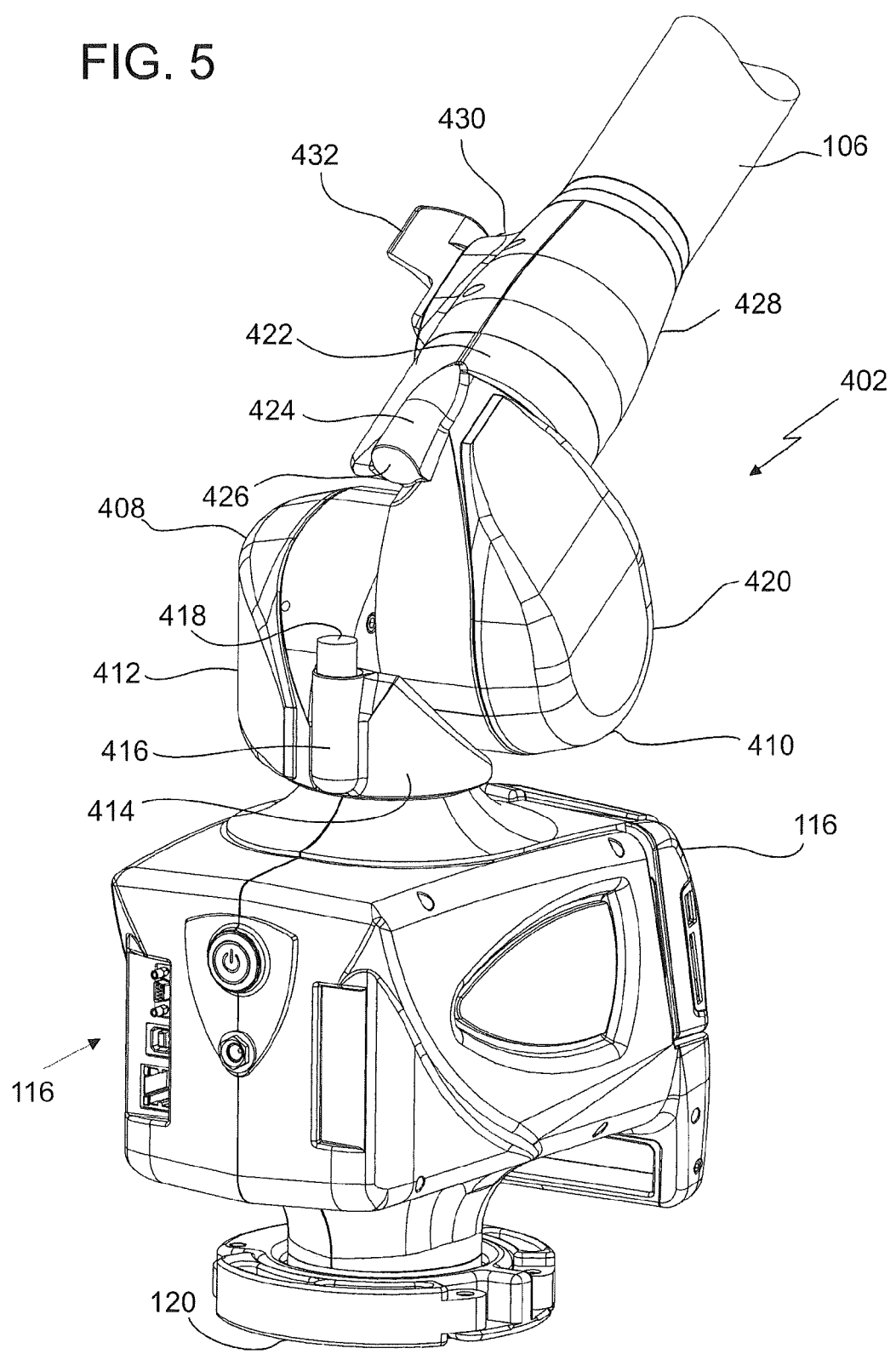
FIG. 5 is a partial perspective view of the first bearing cartridge assembly of FIG. 1 in a second position.

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge pairs 110, 112, 114. The probe interface 226 may connect with the probe end DSP 228 by any suitable communications protocol, including commercially-available products from Maxim Integrated Products, Inc. that embody the 1-Wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to:

measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Referring now to FIGS. 4-11, an embodiment of AACMM 100 having an adjustable counter balance system is shown. The AACMM 100 includes a first rotation assembly 402 that includes a pair of bearing cartridges 402 disposed between the base 116 and the first arm segment 106. The first rotation assembly 402 is configured to rotate about a first axis 404 and a second axis 406. In one embodiment, the first axis 404 is substantially perpendicular to the second axis 406. The first axis 404 is defined by a rotary bearing cartridge 405 (FIG. 7) disposed within the base 116 that allows communications and power conduits to pass from the first arm segment 106 into the base 116.

The first rotation assembly 402 includes a first portion 408 and a second portion 410. The first portion 408 is fixed relative to the second axis 406. The first portion 408 includes a first housing member 412 and a second housing member 414. The second housing member 414 includes a projection 416 having a stop member 418. In the exemplary embodiment, the stop member 418 is an elastomeric material that dampens the impact of the second portion 410 when the first arm segment 106 is rotated to a position substantially co-linear with the first axis 404. As will be discussed in more detail herein, a counter balance assembly is at least partially positioned within the first portion 408.

The second housing member 414 includes a first opening 434 (FIG. 7) that is sized to receive a shaft 436. The second housing member 414 further includes a second opening 438 (FIG. 9) sized to receive a biasing member, such as torsion spring 440 for example. In the exemplary embodiment, the first opening 434 and second opening 438 are substantially co-linear. A third opening 442 is arranged in the second housing member 414 adjacent to the second opening 438. As will be discussed in more detail herein, the third opening 442 is disposed to intersect the second opening 438 to allow at least one projection 444 arranged on one end of the torsion spring 440 to engage a worm gear 446. In one embodiment, the at least one projection 444 includes a plurality of projections that form gear teeth. In the exemplary embodiment, the torsion spring 440 has 28-30 teeth disposed over an arc length of 140 degrees. In the exemplary embodiment, the worm gear 446 has single thread and a pitch diameter of approximately 0.45 inches and a length of approximately 1 inch. The worm gear 446 is retained in position by the force applied by torsion spring 440.

It should be appreciated that while embodiments describe the gear teeth being disposed on the end of the torsion spring, the claimed invention should not be so limited. In one embodiment, the torsion spring is comprised of two counter wound torsion springs with gear teeth formed about a middle portion.

The gear teeth 444 are configured to rotate the end of the torsion spring 440 in response to the rotation of the worm gear 446. The gear teeth 444 and worm gear 446 cooperate to form an adjuster assembly for the torque applied to the first arm segment 106. It should be appreciated that the rotation of the worm gear 446 causes the end of the torsion spring 440 to move or rotate in a manner that results in a change in the torque being applied by the torsion spring 440.

In one embodiment, a first bore opening 448 extends from one end of the third opening 442. The first bore opening 448 is sized to receive a tool (not shown) that couples to rotate the worm gear 446. In another embodiment, the second housing member 414 includes a wall 450. In this embodiment, a second bore opening 452 is arranged co-linearly with the bore opening 448 to allow access of the tool to the worm gear 446.

The second portion 410 is disposed between the first portion 408 and the first arm segment 106. The second portion includes a third housing member 420 and a fourth housing member 422. The second portion 410 rotates about the second axis 406. A projection 424 having a surface 426 extends from the third housing member 420. The projection 424 is arranged such that the surface 426 contacts the stop member 418 when the first arm segment is rotated to a position substantially co-linear with the first axis 404 (the "initial position"). In the exemplary embodiment, the second portion 410 may rotate at least 165 degrees relative to the initial position. The section portion 410 further includes a tapered portion 428 that couples to the first arm segment 106. A projection 430 extends from the tapered portion 428. A bracket 432 is coupled to the projection 430. The bracket 432 is configured to support the second arm segment 108 when the first arm segment 106 and the second arm segment 108 are positioned in parallel.

The third housing 420 is coupled to a second shaft 454. The second shaft 454 has an outer portion 470, an intermediate portion 472 and an inner portion 474. The outer portion 470 has a diameter that is sized to engage and couple to the third housing 420. The outer portion 470 transitions to the intermediate portion 472 at a lip 476. In the exemplary embodiment, the lip 476 provides a stopping feature against which a corresponding feature on the third housing 420 contacts. The diameter of the intermediate portion is sized to receive the inner diameter of the torsion spring 440. The second shaft 454 tapers from the intermediate portion 472 to the inner portion 474. The inner portion 474 has a diameter that is less than the inner diameter of the torsion spring 440 to provide clearance to accommodate changes in the inner diameter of the torsion spring 440 as the first arm segment 106 is rotated.

The second shaft 454 has a substantially hollow interior portion that is disposed about the first shaft 436. The second shaft 454 is coupled to the first shaft 436 by a pair of bearings 456, 458, such as a ball bearing or a roller bearing for example. The bearings 456, 458 allow the rotation of the second portion 410 relative to the first portion 408 about the second axis 406. Additional components, such as spacers 478, collars 480 and washers 482 may also be included to provide the desired spacing and support of the assembly. In one embodiment, an optical encoder assembly 464 is coupled to the second shaft 454 and arranged to measure the rotational movement between the first shaft 436 and the second shaft 454.

Figure 6:
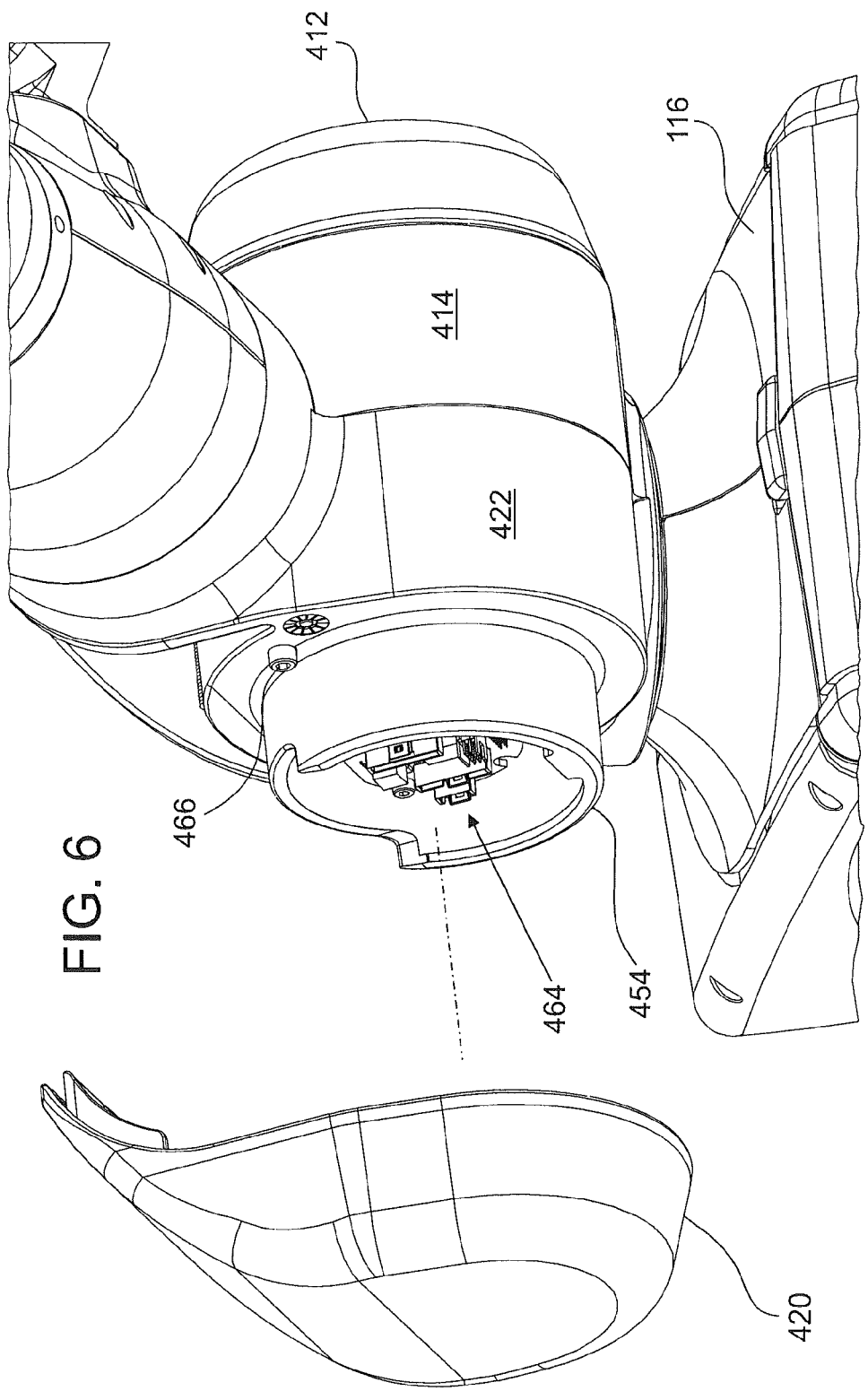
FIG. 6 is a partial exploded perspective view of the first bearing cartridge assembly of FIG. 5.
Figure 7:
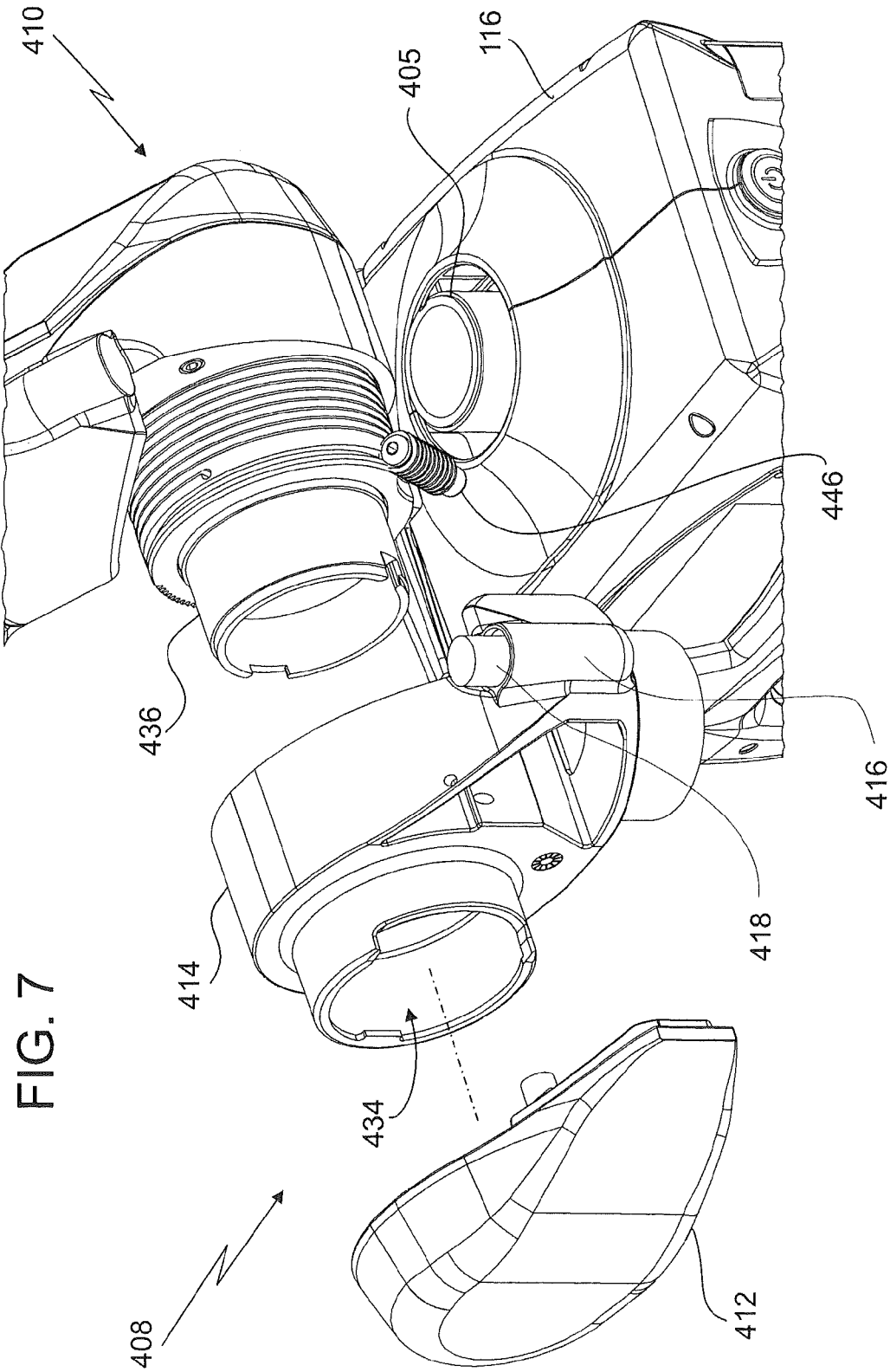
FIG. 7 is another partial exploded perspective view of the first bearing cartridge assembly of FIG. 5.
Figure 8:
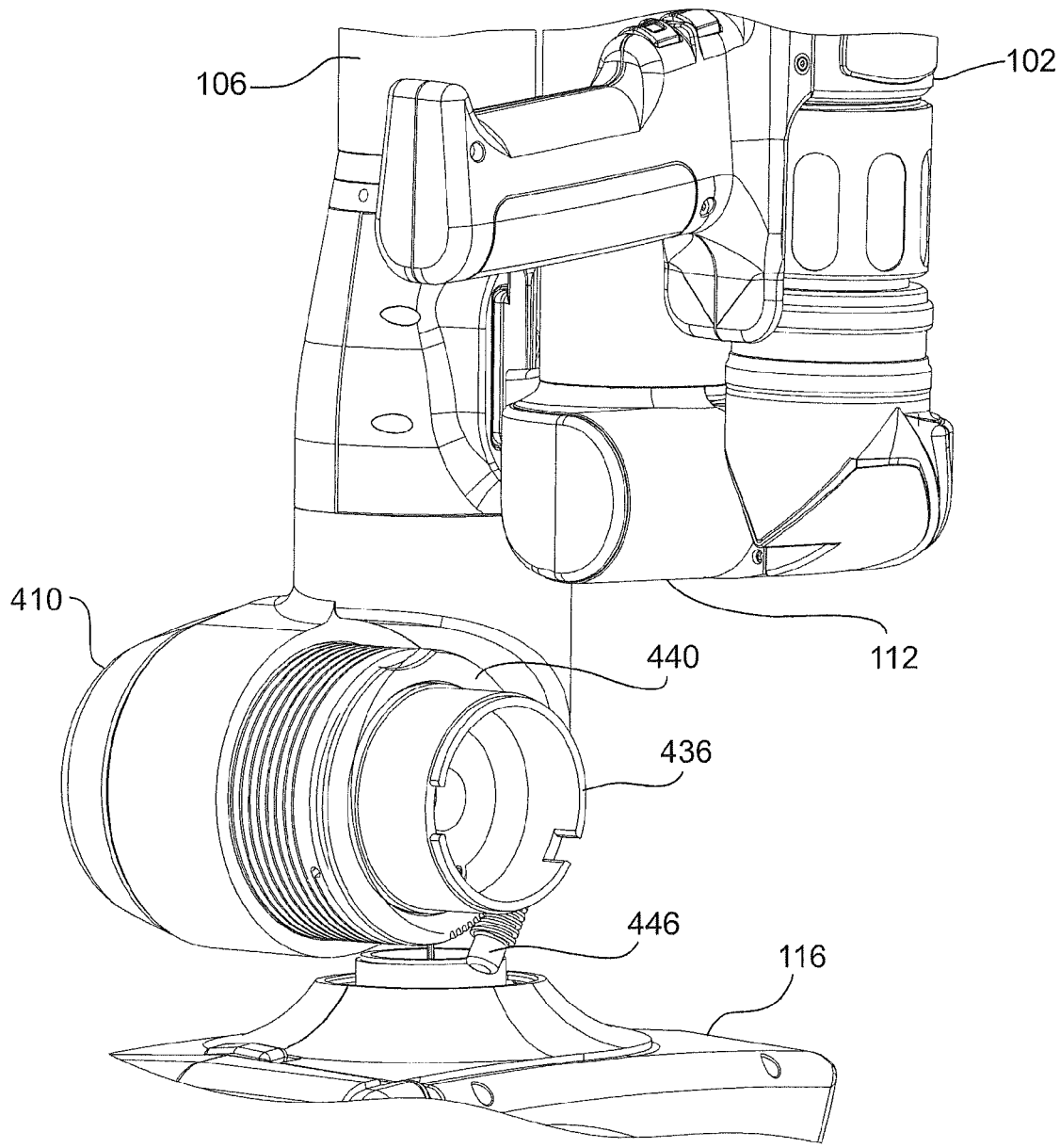
FIG. 8 is a another partial perspective view of the first bearing cartridge assembly of FIG. 4 with a housing cover removed.
Figure 9:
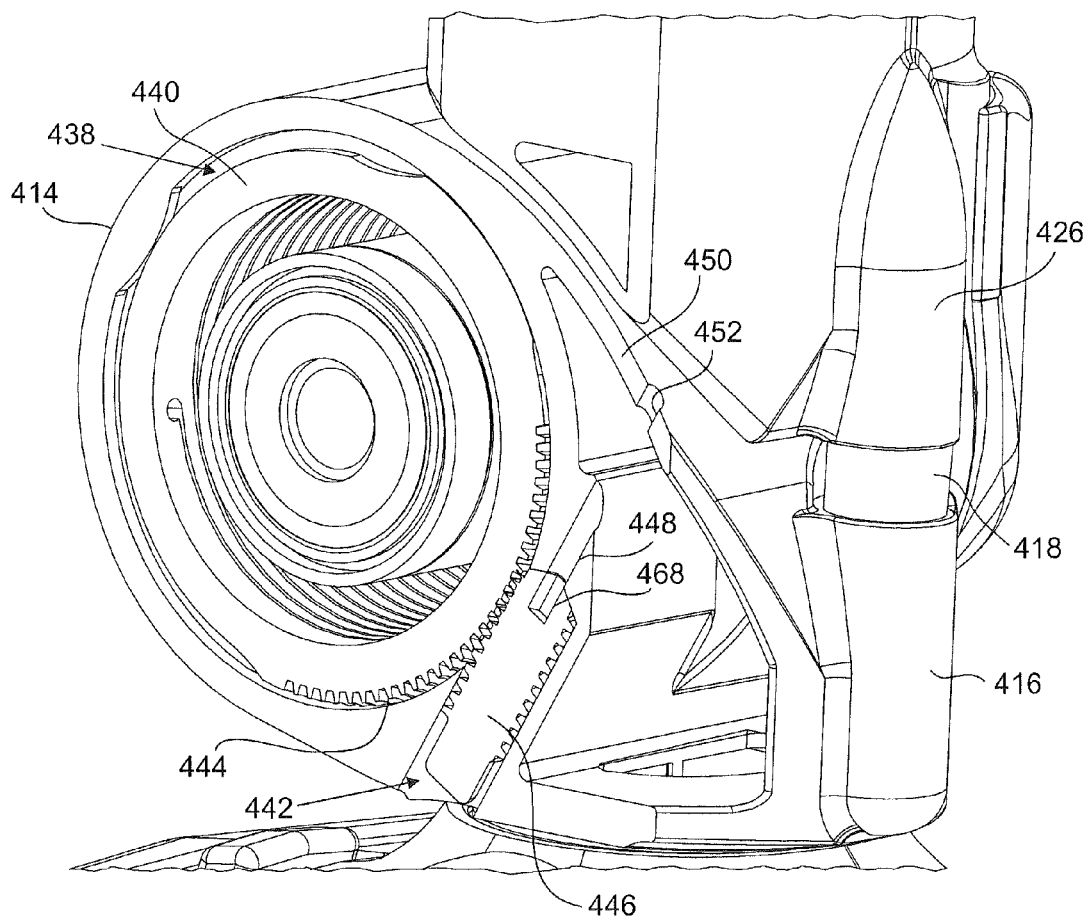
FIG. 9 is another partial perspective view partially in section of the first bearing cartridge assembly of FIG. 4.
Figure 10:
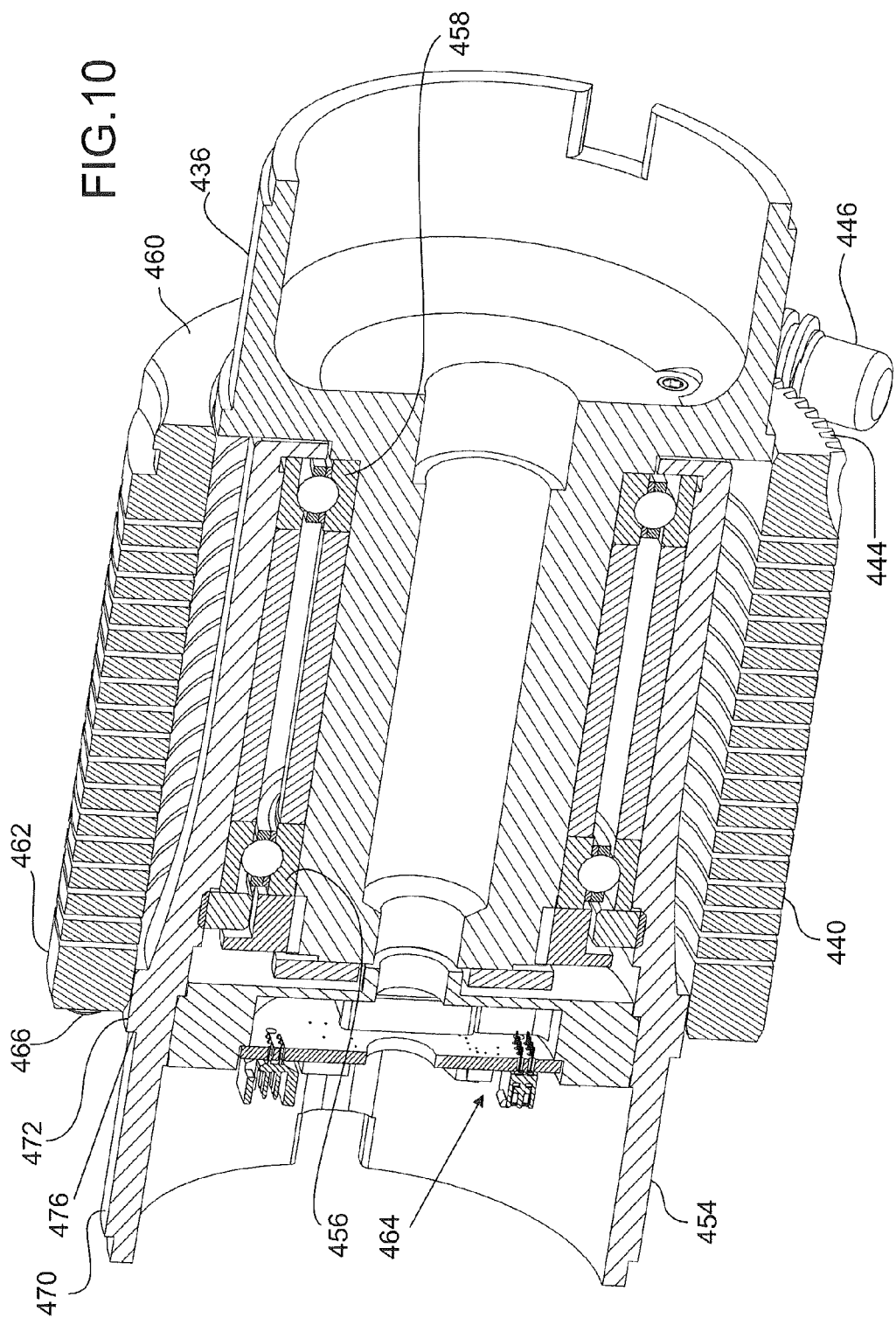
FIG. 10 is a sectional view of a counter balance assembly for the first bearing cartridge assembly of FIG. 4.
Figure 11:
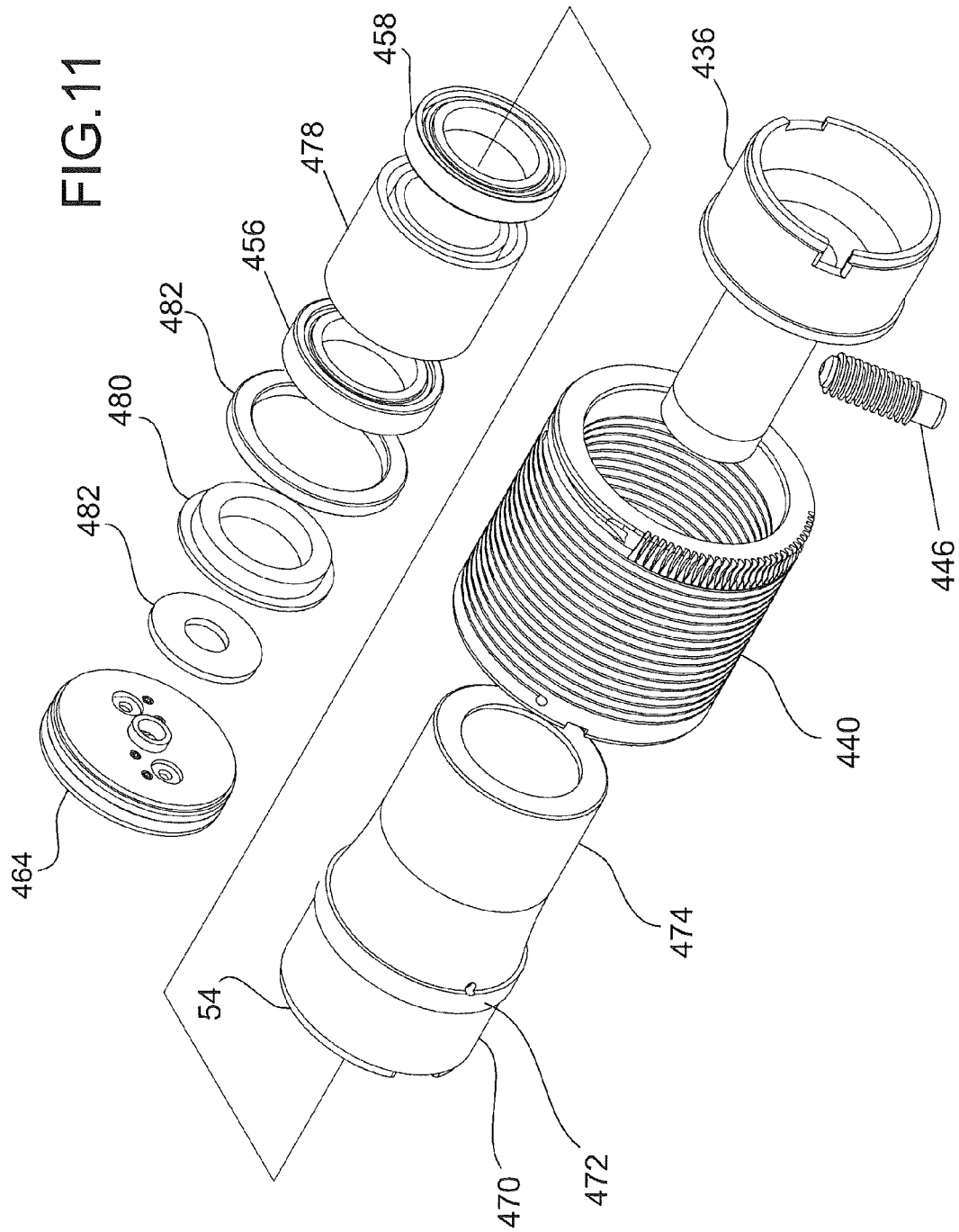
FIG. 11 is an exploded view of the counter balance assembly of FIG. 9.

The torsion spring 440 is disposed about the shafts 436, 454. In the exemplary embodiment, the torsion spring includes a first end 460 adjacent the worm gear 446 and a second end 462 coupled to the second portion 410. In the exemplary embodiment, the second end 462 is coupled to the fourth housing member 422 by at least one fastener 466 (FIG. 6). The fastener 466 couples the second end 462 to the second portion 410 such that when the first arm segment 106 is rotated about the second axis 406 a torque is applied to the first arm segment 106 by the torsion spring 440. The torsion spring 440 is selected to substantially counter balance the weight of the arm portion 104 when the arm segments 106, 108 are articulated to the desired position. In the exemplary embodiment, the torsion spring 440 is configured to provide a torque level that allows the first arm segment to remain at a desired angular position without sagging (e.g. moving downward under the force of gravity) or springing back (e.g. towards the initial position) when the operator releases the measurement device 102.

It should be appreciated that variations in the manufacturing processes of the components of the arm portion 104 may result in the torque produced by the torsion spring 440 being either too large (causing spring back) or too small (causing sagging). To compensate for the variations in components, the AACMM 100 includes an adjuster that provides means for changing the torque. In the exemplary embodiment, the adjustment of the torque is provided by rotating the worm gear 446 within the third opening 442 by inserting a tool through the first bore opening 448 and engaging a feature 468 on the end of the worm gear 446. The feature 468 may be any suitable feature appropriate to engage a tool such as but not limited to a straight slot, a Philips slot, a Frearson slot, a hexagon socket, an Allen socket, a star socket, or a Torx socket for example. By rotating the worm gear 446 clockwise or counter-clockwise, the first end 460 of the torsion spring 440 will be moved from a first position to a second position.

As the first end 460 is moved, the torque applied by the torsion spring 440 on the second portion 410 and thus the first arm segment 106 will increase or decrease. This provides advantages in adjusting the counter balancing torque to the components within a particular arm portion 104. In the exemplary embodiment, the torque may be adjusted from 0 ft-lb to 63 ft-lb over the range 70 degrees of rotation of the worm gear 446 and gear teeth 444 engagement. In one embodiment, the calibration of the torsion spring 440 is performed during the manufacturing assembly and a cap or plug (not shown) is inserted into the first bore opening 448 or second bore opening 452 to prevent tampering. In one embodiment, a set screw is used to lock the worm gear 446 to prevent movement.

Figure 12:
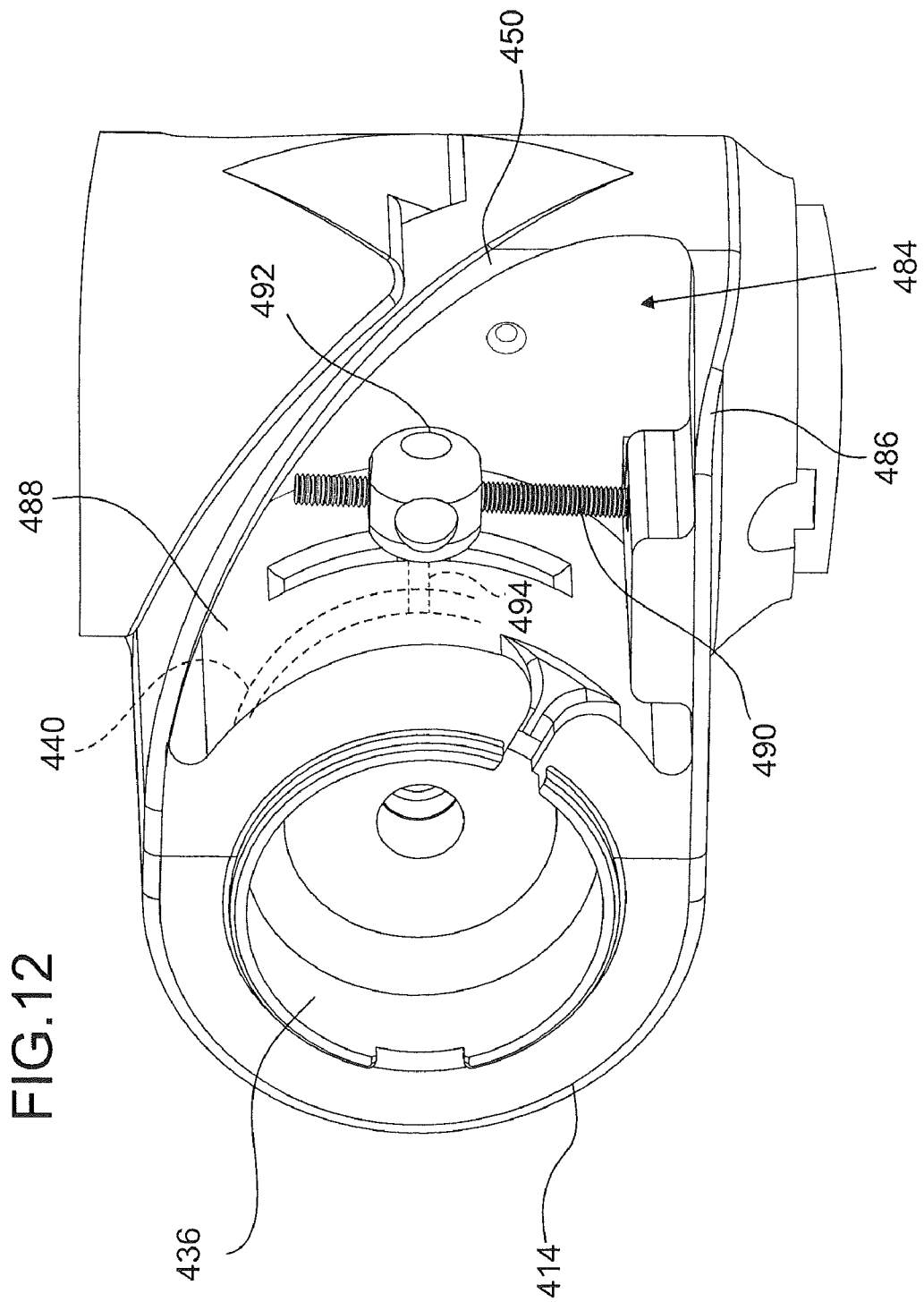
FIG. 12 is another embodiment of a counter balance assembly for the coordinate measurement device of FIG. 1.

Another embodiment of an adjuster assembly is shown in FIG. 12. In this embodiment, the second housing member 414 has a substantially hollow interior portion 484 defined by walls 450, 486 and 488. Arranged within the interior portion 484 is a threaded member 490, such as a threaded rod for example. The threaded member 490 is coupled for rotation between the walls 450, 486. The threaded member 490 may include a feature (not shown), similar to feature 486 for example, that allows the user to insert a tool to rotate the threaded member. A collar 492 is coupled to the threaded member 490. The collar 492 includes an internal thread that engages the threads of the threaded member 490 such that when the threaded member 490 is rotated, the collar 492 translates along the longitudinal axis of the threaded member 490. An arm 494 extends between the collar 492 and the torsion spring 440. The arm 494 may be a separate member from or integral with the torsion spring 440. As such, when the collar translates along the threaded member, the first end 460 of the torsion spring 440 moves from a first position to a second position. As described above, the movement of the first end 460 allows the calibration of the torque output of the torsion spring 440 to provide the desired level of counter balance.

It should be appreciated that while embodiments of the invention describe an adjuster that is manually adjusted, the claimed invention should not be so limited. In one embodiment, a motor such as a stepper motor is coupled to rotate the adjuster. In one embodiment, the stepper motor is coupled with a controller that adjusts the torque of the torsion spring based on the position of the arm.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measurement device (AACMM) for measuring coordinates of an object in space, comprising:

a base;

a manually positionable articulated arm portion having an opposed first end and second end, the arm portion being rotationally coupled to the base, the arm segment including a plurality of connected arm segments, each of the arm segments including at least one position transducer for producing a position signal;

a measurement device attached to the first end;

an electronic circuit for receiving the position signals from the transducers and for providing data corresponding to a position of the measurement device;

a rotation assembly coupling the second end to the base, the rotation assembly having a first axis of rotation and a second axis of rotation substantially perpendicular to the first axis of rotation;

a biasing member operably coupled between the rotation assembly and the second end to apply a force to the second end about the second axis of rotation the biasing member having at least one projection thereon; and an adjuster having a threaded portion, the threaded portion being arranged to engage the at least one projection, wherein the force applied by the biasing member to the arm portion changes in response to movement of the adjuster.

2. The AACMM of claim 1 wherein:

the biasing member is a torsion spring; and the force applies a first torque to the arm portion.

3. The AACMM of claim 2 wherein:
the at least one projection includes a plurality of gear teeth disposed on a third end; and
the adjuster is a worm gear engageably coupled to the plurality of gear teeth.

4. The AACMM of claim 3 wherein the worm gear is rotatably disposed within a housing, the housing being rotatably coupled to the base to rotate about the first axis of rotation.

5. The AACMM of claim 4 wherein the worm gear includes a feature on a fourth end sized to receive a tool, the worm gear rotating in response to an application of a second torque by the tool on the feature.

6. The AACMM of claim 5 wherein the housing includes a opening axially aligned with the worm gear and having a fifth end adjacent the feature, the opening being sized to receive the tool.

7. The AACMM of claim 6 wherein the torsion spring is coupled to the first end on a sixth end opposite the plurality of gear teeth.

8. The AACMM of claim 2 wherein:
the at least one projection is an arm coupled on a third end to the torsion spring; and
the adjuster includes a collar coupled between the threaded portion and the arm, wherein the collar moves the arm from a first position to a second position in response to a rotation of the adjuster.

9. A portable articulated arm coordinate measurement device (AACMM) for measuring coordinates of an object in space, comprising:
a base;
a manually positionable articulated arm portion having an opposed first end and second end, the arm portion including a plurality of connected arm segments, each of the arm segments including at least one position transducer for producing a position signal;
a measurement device attached to the first end;
an electronic circuit for receiving the position signals from the transducers and for providing data corresponding to a position of the measurement device;
a biasing member operably coupled between the base and the second end, the biasing member having at least one projection movable between a first position and a second position; and
an adjuster having a threaded portion operably coupled between the base and the biasing member, wherein the threaded portion is engaged to the at least one projection to move the at least one projection between the first position to the second position.

10. The AACMM of claim 9 wherein:
the adjuster is a worm gear; and
the at least one projection includes a plurality of gear teeth, the plurality of gear teeth being arranged to engage the worm gear.

11. The AACMM of claim 10 wherein the biasing member is a torsion spring.

12. The AACMM of claim 11 wherein the torsion spring applies a first torque on the articulatable arm when the plurality of gear teeth are in the first position and a second torque when the plurality of gear teeth are in the second position.

13. The AACMM of claim 12 further comprising a housing member coupled to the base, the housing member defining a first opening sized to receive and retain the worm gear and a second opening extending from the first opening and sized to receive a tool.

14. The AACMM of claim 9 wherein:
the adjuster includes a collar operably coupled to the threaded portion; and
the at least one projection is an arm coupled to the collar.

15. A portable articulated arm coordinate measurement device (AACMM) for measuring coordinates of an object in space, comprising:
a base;
a manually positionable articulated arm portion having an opposed first end and second end, the arm portion including a plurality of connected arm segments, each arm segment including at least one position transducer for producing a position signal;
a measurement device attached to the first end;
an electronic circuit which receives the position signals from the transducers and provides data corresponding to a position of the measurement device;
a rotation assembly rotationally coupling the second end to the base about a first axis of rotation and a second axis of rotation, the second axis of rotation being substantially perpendicular to the first axis of rotation;
a biasing member arranged within the rotation assembly and having a third end operably coupled to the second end, the biasing member having a fourth end opposite the third end, the fourth end being movable between a first position and a second position; and
an adjusting member operably coupled for rotation to the base and operably coupled to the fourth end, wherein the fourth end moves between the first position and the second position in response to a rotation of the adjusting member.

16. The AACMM of claim 15 wherein the rotation assembly further includes a housing, the housing defining a first opening sized to receive the adjusting member.

17. The AACMM of claim 16 wherein the biasing member is a torsion spring having a plurality of gear teeth on the fourth end, and the adjusting member is operably coupled to the gear teeth.

18. The AACMM of claim 17 wherein:
the adjusting member includes a worm screw portion; and
the housing includes a second opening extending from a fifth end of the first opening, the second opening sized to receive a tool.

19. The AACMM of claim 15 wherein the adjuster includes a threaded member and a collar disposed between the threaded member and the fourth end, the collar having a threaded portion engaged with the threaded member.

20. The AACMM of claim 19 further comprising an arm coupled between the collar and the fourth end, wherein the arm moves the fourth end between the first position and the second position in response to rotation of the threaded member.

* * * * *